United States Patent [19]

Dietrich et al.

[11] Patent Number: 4,919,778
[45] Date of Patent: Apr. 24, 1990

[54] PROCESS FOR THE PRODUCTION OF CURVE GLAZING WITH A HIGH TRANSMITTANCE IN THE VISIBLE SPECTRAL RANGE AND A HIGH REFLECTANCE FOR THERMAL RADIATION

[75] Inventors: Anton Dietrich, Wiesenfelden; Klaus Hartig, Ronneburg; Joachim Szczyrbowski, Regensburg, all of Fed. Rep. of Germany

[73] Assignee: Leybold-Heraeus GmbH, Cologne, Fed. Rep. of Germany

[21] Appl. No.: 356,668

[22] Filed: May 19, 1989

Related U.S. Application Data

[63] Continuation of Ser. No. 881,704, Jul. 3, 1986, abandoned.

[30] Foreign Application Priority Data

Dec. 6, 1985 [DE] Fed. Rep. of Germany ....... 3543178

[51] Int. Cl.$^5$ .............................. C23C 14/34
[52] U.S. Cl. ......................... 204/192.27; 204/192.15; 204/192.26; 65/106
[58] Field of Search .................... 204/192.12, 192.15, 204/192.22, 192.26, 192.27, 192.28, 192.29; 65/60.2, 60.4, 106, 107

[56] References Cited

U.S. PATENT DOCUMENTS

| Re. 25,711 | 1/1965 | Gaiser | 156/101 |
| 4,337,990 | 7/1982 | Fan et al. | 204/192.27 X |
| 4,497,700 | 2/1985 | Groth et al. | 204/192.27 |
| 4,548,691 | 10/1985 | Dietrich et al. | 204/192.27 |
| 4,650,557 | 3/1987 | Bitter | 204/192.28 X |

Primary Examiner—Nam X. Nguyen
Attorney, Agent, or Firm—Felfe & Lynch

[57] ABSTRACT

A system of layers is built up on substrates of mineral glass in the following order: first layer: an oxide from the group, stannic oxide, silicon dioxide, aluminum oxide, tantalum oxide, zirconium oxide, or their mixed oxides; second layer: a metal from the group, tantalum, tungsten, nickel, iron; third layer: silver or a silver alloy containing at least 50 weight-percent of silver; fourth layer: a metal from the group, tantalum, tungsten, nickel, iron or their alloys; fifth layer: an oxide from the group, stannic oxide, silicon dioxide, aluminum oxide, tantalum oxide, zirconium oxide or their mixed oxides. After that, the substrate with all the coating layers is heated to the softening temperature of the glass in an oxidizing atmosphere and bent to the final shape.

10 Claims, 2 Drawing Sheets

PROCESS FOR THE PRODUCTION OF CURVE GLAZING WITH A HIGH TRANSMITTANCE IN THE VISIBLE SPECTRAL RANGE AND A HIGH REFLECTANCE FOR THERMAL RADIATION

This application is a continuation, of application Ser. No. 881,704, filed July 3, 1986 abandoned.

BACKGROUND OF THE INVENTION

The invention relates to a process for the production of glazing with a high transmittance in the visible spectral range, and with a high reflectance for thermal radiation. More particularly, the invention relates to producing a curved glazing consisting of a glass substrate having first and fifth layers of oxide, second and fourth layers of protective metal, and a third layer of silver therebetween.

Such glazing is to transmit as much as possible of visible light and block as much as possible of the invisible part of the spectrum of solar radiation. In summer this is to prevent the undesired thermal radiation of sunlight into rooms. Especially in motor vehicles such thermal radiation is particularly undesirable on account of the sloping and therefore very large windshields and rear windows.

DE-OS No. 33 07 661 to which U S. Pat. No. 4,548,691 to Dietrich corresponds, and EP-OS No. 104 870 have disclosed the concept of sandwiching between two oxide coatings a silver coating and a very thin metal coating applied to the silver, the thin metal coating protecting the silver coating against chemical-thermal attack during the production of the topmost oxide coating. If, however, such a sandwich system is exposed to temperatures above 150° C., a diffusion of the silver into the contiguous oxide and/or metal coatings occurs, and in this case a great increase of the surface resistance and a corresponding lowering of the transmittance of the system is to be observed, i.e., two of the important properties of the layered system are degraded.

EP-PS 35 906 discloses the concept of arranging a thin metallic coating on one side or both sides of a silver coating and sandwiching this coating system likewise between two oxide layers. The thin metallic layer is intended to achieve greater long-term stability, but the studies are limited to a temperature range up to 120° C. Since the absorptance of the metallic layers causes an impairment of the optical transparency of the coated substrates, the total thickness of the metallic layers for the achievement of a particular transmittance is limited, and therefore it is to be preferred to apply only one metallic coating to the side of the silver coating facing away from the substrate so as to limit the degradation of the transmittance. It was found however that, when substrates of mineral glass and such a layered system are heated to temperatures markedly higher than 150° C., a degradation of the properties of the layers occurred, resulting not only in an increase in the transmittance in the visible range, desirable in itself, but also by an undesired increase of the surface resistance, so that the onboard voltage of a normal motor vehicle no longer suffices to perform sufficient heating in winter. Furthermore, spotting and undesired light scatter were observed, which evidently are to be attributed to a partial agglomeration as well as to a partial diffusion of the silver into the oxide layers.

This behavior leads only to the conclusion that the thickness of the metallic layer or layers is no longer sufficient for the effective protection of the silver layer, especially at higher temperatures, in view of the targeted high transmittance in the visible range which is to be attributed in part to requirements of law (motor vehicle windshields).

It is known to produce curved or protuberant glazing with an approximately similar spectral behavior by applying a silver coating sandwiched between other coatings to prepared glass substrates. This, however, calls for special coating apparatus allowing for the different shapes of the substrates, and the compensation of the effects of varying distances between units of area of the substrate and the coating sources and of the varying angles at which the coating material impinges by means of complicated masking.

The invention is therefore addressed to the problem of devising a process of the kind specified in the beginning, whereby curved or protuberant glazing can be produced in a more economical manner.

SUMMARY OF THE INVENTION

The invention resides in selecting the thickness of the second and fourth layers of protective metal to have a lower transmittance than ultimately desired, heating the coated glazing in an oxidizing atmosphere at least to the softening temperature of the glass, and bending the substrate while it is being heated.

It has surprisingly been found that the already-coated glazing not only can be heated to the softening temperature of the mineral glass of approximately 640° C., but that it can also be plastically deformed, i.e., bent, at such temperatures, together with the coating layers already applied, and/or can be tempered by quenching, without impairment of the coating properties much less detachment thereof. This finding was not foreseeable, since the known coating systems lose their important properties even when a temperature of about 150° C. is exceeded.

The possibility of bending pre-coated glass, preferably for use in automobile glazing, leads to the very considerable advantage that the coating can be performed in conventional vacuum apparatus, e.g., by vacuum vapor deposition and/or cathode sputtering, and that the glazing in the final step of the process after leaving the vacuum apparatus can be bent and/or heat-treated in air without disadvantageously altering the targeted properties of the coated glass. This advantage is not to be underestimated because the handling of curved glazing in vacuum apparatus involves considerable problems, and the coating of heavily curved pieces is problematical whenever the coating material fails to impinge upon the substrate or glass sheet at substantially right angles.

In the process according to the invention the silver layer is not only protected on both sides by metal coatings of tantalum, tungsten, nickel, iron or alloys made with these metals, but these metal coatings also can be applied in such a thickness that, were it not for the reactive heat treatment, they would have transmittances in the visible range which are definitely too low for the required end purpose. Such comparatively thick coatings of the above-named metals, tantalum, tungsten, nickel and/or iron, however, provide excellent protection for the silver even under heat treatment considerably above 150° C., so that the otherwise observed spotting and light scatter do not occur.

By the heat treatment in an oxidizing atmosphere above the softening temperature of the glass, the initially too low transmittances in the visible range are decidedly improved and raised to a level which does correspond to the required application of the the glazing in question.

In the case of the glazing according to the invention, while retaining the minimum transmittances in the visible spectral range, the average transmitted solar energy radiation can be lowered to levels below 50%, while most of the solar radiation is reflected, i.e., does not contribute to the heating of the glazing as it does in the case of glasses colored in the mass or of applied films.

A further advantage of the glazing according to the invention is that, due to the low surface resistance of the silver layer between appropriate contacts, an electrical current can be applied to the glazing so that, if the glass should ice up, it can be rapidly defrosted. For example, in the process according to the invention, a higher surface resistance was measured before the oxidative heat treatment, but a lower surface resistance after the oxidative heat treatment. This lowering of the surface resistance is an effect that is precisely the opposite of that which would occur in the case of a diffusion process and is evidently to be attributed to a recrystallization process. For in a diffusion process, an increase of the surface resistance is to be expected. At surface resistances below about 5 ohms per square, however, heating with the usual on-board voltage of 12 V is easily possible.

By sandwiching the silver layer between metal layers of relatively great thickness, the silver layer is effectively protected on both sides against the diffusion of oxygen from the oxide layers also situated on both sides. The metal layers in question are preferably applied in an atmosphere that is oxygen-free or of the lowest possible oxygen content, since coatings which from the outset are already partially oxidized are too porous and cannot perform their function as diffusion barriers. By the oxidative heat treatment that follows, however, the originally too low transmittance is increased back to the prescribed levels; this is because the thin metallic layers next to the silver layer are converted at least partially to their oxides, and this happens at a sufficiently slow rate on account of the presence of oxygen at temperatures of at least about 640° C. This signifies that the precise thickness of the metallic layers next to the silver layer has to be determined by experiment for a specific heat treatment. The establishment of the thicknesses of the protective metal layers b) and d) is performed by optical measurements on the intermediate product, i.e., before the heat treatment, and by the appropriate selection of the rate of deposit and the coating time, i.e., by a corresponding variation of these coating parameters according to the layer properties after the heat treatment. Expressing it another way, this means that, on the basis of the effect of the heat treatment, the starting state has to be determined in advance in order to achieve the desired end result after the heat treatment. The metallic layers in question will preferably be of different thicknesses, since they are exposed to different oxidation conditions on account of the different lengths of the diffusion paths.

The silver layer in this case can be a pure silver layer, but the silver can be alloyed also with copper (maximum 20 percent by weight, palladium (maximum 30 percent by weight) and platinum (maximum 20 percent by weight).

It has furthermore been found that the heat treatment quite evidently can accomplish a healing of defects in the silver layer, and a decided improvement of the optical and electrical data of the finished glazing is achieved. It is especially advantageous to add to the fifth layer, i.e., the uppermost oxide coating, amounts of 4 to 8 weight percent of antimony or fluorine, or from 5 to 15 weight percent of tin, in order to facilitate the establishment of contacts on the electrically conductive layers by soldering. The individual layers, especially the oxide layers a) and e), can themselves be built up of layers, i.e., a series of two different oxides or oxide mixtures is considered as one layer, even though it is inhomogeneous in itself.

Additional advantageous developments of the subject matter of the invention and the product of the process are listed in the other subordinate claims.

DESCRIPTION OF PREFERRED EMBODIMENTS

Figure 1:
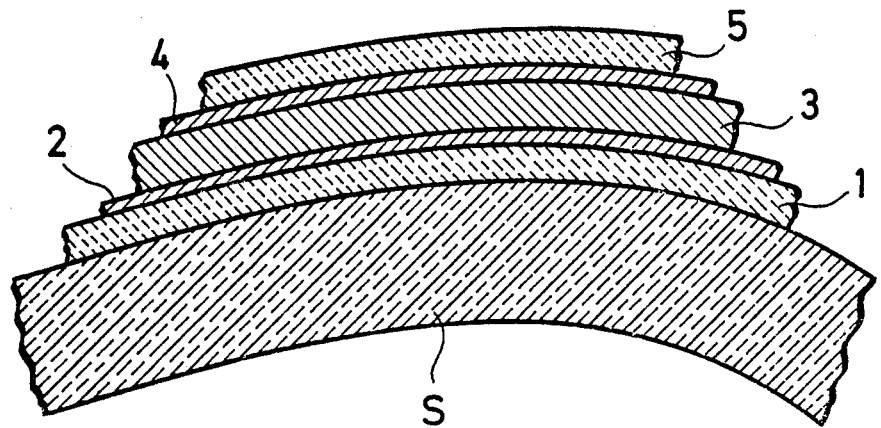
FIG. 1 is a cross section through a system of a total of five layers.

In FIG. 1, S designates the substrate, which consists of a mineral glass such as, for example, a common float glass such as sodium silicate glass. Onto this substrate there is applied a first coating 1 of an oxide from the group, stannic oxide, silicon dioxide, aluminum oxide, tantalum oxide, zirconium oxide, or their mixed oxides. On this coating there is a second coating 2 of a metal from the group, tantalum, tungsten, nickel and iron or alloys containing portions of these metals. Next follows a third coating 3 of silver or a silver alloy containing at least 50% by weight of silver, and on that a fourth coating 4 of a metal from the group, tantalum, tungsten, nickel, iron or alloys containing at least 50% by weight of one of these metals, and the final or cover coating is a fifth coating 5, which like the first coating again consists of an oxide from the group, stannic oxide, silicon dioxide, aluminum oxide, tantalum oxide, zirconium oxide, or such oxides in mixture. It is to be understood that, in regard to the third coating 3 of silver, it is not necessary to have a symmetrical build-up of the layers, and that the coating materials can also be varied within the metals and oxides specified in a group.

Figure 2:
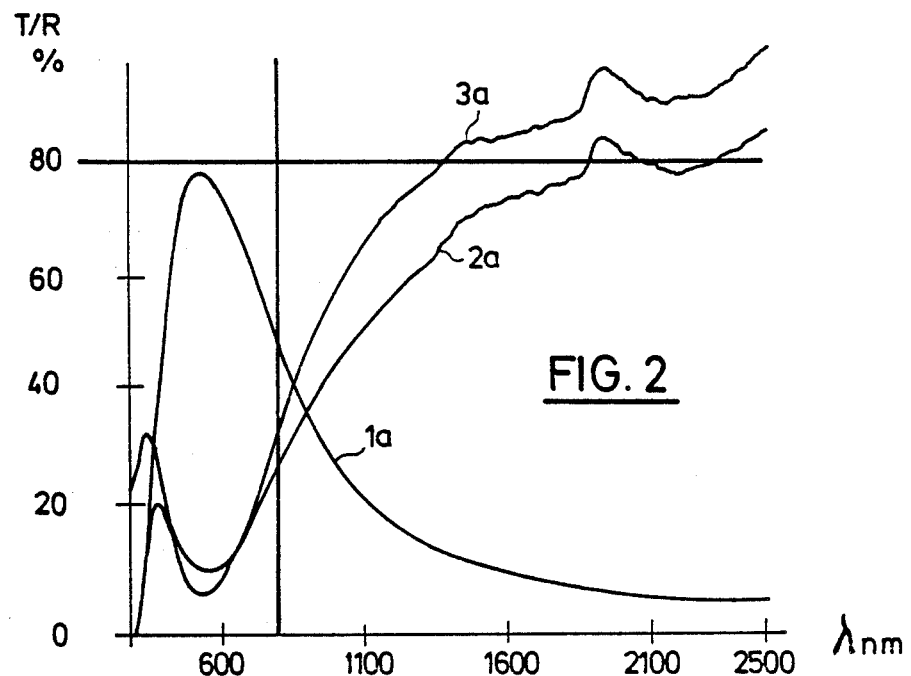
FIG. 2 represents transmittance and reflectance curves before the oxidative heat treatment.
Figure 3:
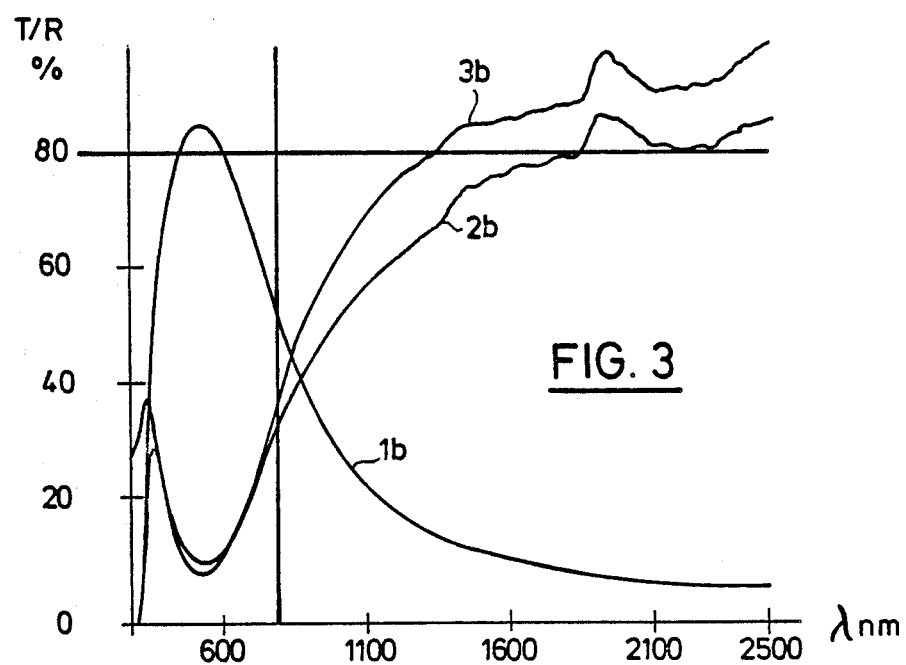
FIG. 3 represents transmittance and reflectance curves after the oxidative heat treatment.

In FIGS. 2 and 3, the transmittances T and the reflectances R are recorded in percent on the axis of ordinates. A horizontal line is traced where T and R equal 80%.

In FIGS. 2 and 3 the curves 1a and 1b represent the transmittances T, curves 2a and 2b the reflectances R on the glass side, and curves 3a and 3b the reflectances R on the coating side. It can clearly be seen that the transmission maximum in the visible range between 500 and 550 nm has been raised from about 78% to 85% by the oxidative heat treatment. The reflectances also have markedly improved.

EXAMPLES

EXAMPLE 1

In a vacuum coating apparatus made by Leybold-Heraeus GmbH with the model number A 1100 Z3H/4 for flat glass, which was equipped with high-power sputtering cathodes (magnetron cathodes), sheets of float glass with the dimensions $1200 \times 800 \times 2$ mm thick, were coated with stannic oxide, nickel, silver, nickel and stannic oxide in that order, according to FIG. 1, the individual coatings having the following thicknesses.

| Coating 1: | stannic oxide | 35 nm |
|---|---|---|
| Coating 2: | nickel | * |
| Coating 3: | silver | 20 nm |
| Coating 4: | nickel | * |
| Coating 5: | stannic oxide | 35 nm |

*Experimentally adapted, so that the maximum transmittance of the intermediate product (i.e., before heat treatment) amounted to 67% in the visible range.

Then the coated glass was exposed in air to a temperature of 640° C. for a period of 5 minutes in an oven with uniform temperature distribution, and a bending of the glass was performed. It was apparent from the measured data that the oxidative heat treatment had increased the optical transmittance in the visible spectrum by about 8% and the surface resistance had been reduced by 1.0 ohm per square. This means that the desired properties of the glass had been decidedly improved by the heat treatment.

EXAMPLE 2

In the same manner as in Example 1, the system of layers specified below was prepared:

| Layer 1: | stannic oxide | 35 nm |
|---|---|---|
| Layer 2: | tantalum | * |
| Layer 3: | silver | 25 nm |
| Layer 4: | tantalum | * |
| Layer 5: | stannic oxide | 35 nm |

*Adapted by experiment so that the maximum transmittance in the visible range amounted to 77%. The optical data of the sandwich are represented in FIG. 2, namely the transmittance T and the reflectance R on the coated side and on the glass side. The measurements in question were performed with a Perkin Elmer Model Lambda 9 spectral photometer equipped with an Ulbricht ball for the reflectance measurements. Also, from the measured data the light transmittance and the solar energy transmittance were calculated according to DIN 67507 (see Table). The optical data measured after the same oxidative heat treatment as in Example 1, and again in FIG. 3

The spectral relationship between the transmittance and reflectance corresponded substantially to the curves in FIG. 3. Here again the oxidative heat treatment resulted in an increase of the maximum transmittance from 75% to 83% and a lowering of the surface resistance from 4.7 ohms per square to 2.5 ohms per square. It was furthermore found that after the heat treatment 34% of the solar energy radiation was reflected and only about 15% absorbed, so that the total solar energy transmittance was limited to 50%.

TABLE

| Wavelength range | Transmittance % | | Reflectance glass side % | | Reflectance coating side % | | Absorptance glass side % | | Absorptance coating side % | |
|---|---|---|---|---|---|---|---|---|---|---|
| | before | after | before | after | before | after | before | after | before | after |
| Visible light (380–780 nm) | 75.8 | 82.9 | 10.0 | 9.6 | 6.8 | 8.4 | — | — | — | — |
| Sunlight (380–2500 nm) | 45.4 | 50.8 | 31.2 | 33.9 | 36.7 | 38.8 | 23.4 | 15.3 | 17.9 | 10.4 |
| Ultraviolet (280–380 nm) | 24.9 | 41.3 | — | — | — | — | — | — | — | — |

We claim:
1. Process for the production of curved glazing with a high transmittance in the visible range and a high reflectance for thermal radiation, comprising the following steps:
   (a) coating a mineral glass substrate with a first layer of at least one oxide selected from the group consisting of stannic oxide, silicon dioxide, aluminum oxide, tantalum oxide, and zirconium oxide,
   (b) coating the first layer with a second layer of at least one metal selected from the group consisting of tantalum, tungsten, nickel, and iron or alloys with at least fifty percent by weight of one of these metals, the thickness of this layer being selected to have a lower transmittance of visible light than desired in the finished glazing,
   (c) coating the second layer with a third layer selected from the group consisting of silver and a silver alloy with at least fifty percent silver by weight,
   (d) coating the third layer with a fourth layer of a metal selected from the group forming the second layer, the thickness of said fourth layer being selected to have a lower transmittance of visible light than desired in the finished glazing,
   (e) coating the fourth layer with a fifth layer of at least one oxide selected from the group forming the first layer,
   (f) heating the coated substrate in an oxidizing atmosphere at least to the softening temperature of the glass until the second and fourth layers are oxidized sufficiently to increase the average transmittance by at least 5 percent,
   (g) bending the substrate during said heating in said oxidizing atmosphere.

2. Process according to claim 1 wherein the first layer and the fifth layer are produced by cathode sputtering of targets of the metallic oxide formers in a reactive atmosphere (oxygen and noble gas) and the second, third and fourth layers by cathode sputtering of targets of the named metals or metal alloys in a neutral atmosphere (noble gas).

3. Process according to claim 1 wherein that second and fourth layer are produced from at least one of the named metals to which at least one metallic additive from the group 4b, 5b, 6b and 8 of the periodic system has been added, the total amount added not exceeding 15 weight percent.

4. Process as in claim 1 wherein the coated substrate is heated until the average transmittance is increased by at least 8 percent.

5. Process as in claim 1 wherein the thickness of the second, third, and fourth layers is selected to have a maximum transmittance of 65 to 80 percent before heat treatment and 70 to 85 percent after heat treatment.

6. Process according to claim 1 wherein the thickness of the third layer is selected to have a surface resistance of 2 to 10 ohms per square after heat treatment.

7. Process according to claim 6 wherein the thickness of the third layer is selected to have a surface resistance of 2 to 5 ohms per square after heat treatment, whereby heating an automotive windshield of curved glazing so produced can be accomplished with a 12 volt electrical system.

8. Process as in claim 1 wherein the second, third, and fourth layers are applied in an atmosphere that is oxygen free.

9. Process as in claim 1 wherein said fifth layer further comprising 4 to 8 weight percent of at least one element selected from the group consisting of antimony and flourine.

10. Process as in claim 1 wherein said fifth layer further comprises 5 to 15 weight percent of tin.

* * * * *